United States Patent [19]

Nangle

[11] Patent Number: 4,936,539
[45] Date of Patent: Jun. 26, 1990

[54] RESILIENT SUPPORT BLOCKS

[76] Inventor: William O. Nangle, 356 Muskegon, Calumet City, Ill. 60409

[21] Appl. No.: 189,230

[22] Filed: May 2, 1988

[51] Int. Cl.⁵ .............................................. F16F 1/00
[52] U.S. Cl. .................................... 248/633; 267/140
[58] Field of Search ............... 248/615, 622, 632, 633, 248/634, 638, 176, 177, 345.1, 359.1; 269/296, 900; 267/292, 152, 139, 140, 141, 153; 29/783, 791

[56] References Cited

U.S. PATENT DOCUMENTS

| | | | |
|---|---|---|---|
| 2,335,692 | 11/1943 | Murray | 269/296 |
| 2,873,993 | 2/1959 | Savke | 267/292 |
| 2,911,207 | 11/1959 | Coble | 267/153 |
| 2,926,904 | 3/1960 | Erlbacher | 267/140 |
| 3,191,896 | 6/1965 | Nathan | 248/633 |
| 3,275,131 | 9/1966 | Erickson | 206/46 |
| 3,301,335 | 1/1967 | Snelling | 173/162 |
| 3,311,331 | 3/1967 | Steimen | 248/633 |
| 3,338,542 | 8/1967 | Meinhard | 248/345.1 |
| 3,455,546 | 7/1969 | Shanok et al. | 267/1 |
| 3,477,674 | 11/1969 | Schaller | 267/153 |
| 3,539,173 | 11/1970 | Sampson | 267/140 |
| 3,545,737 | 12/1970 | Lamprey et al. | 267/141 |
| 3,856,613 | 12/1974 | Weller | 161/116 |
| 4,066,234 | 1/1978 | Nycum | 248/633 |
| 4,072,334 | 2/1978 | Seegmiller et al. | 293/71 |
| 4,101,704 | 7/1978 | Hiles | 428/218 |
| 4,277,526 | 7/1981 | Jackson | 428/31 |
| 4,360,549 | 11/1982 | Ozawa et al. | 428/31 |
| 4,496,054 | 1/1985 | Koltun | 206/521 |
| 4,750,720 | 6/1988 | Wolf | 267/292 |

FOREIGN PATENT DOCUMENTS

| | | | |
|---|---|---|---|
| 544390 | 7/1957 | Canada | 248/634 |
| 1239789 | 7/1960 | France | 248/634 |
| 643686 | 1/1979 | U.S.S.R. | 267/153 |
| 1015150 | 4/1983 | U.S.S.R. | 267/153 |

Primary Examiner—Ramon O. Ramirez
Assistant Examiner—Robert A. Olson
Attorney, Agent, or Firm—Myers & Ehrlich, Ltd.

[57] ABSTRACT

A support assembly is provided to support a body part, as of an automobile or other assembled article. The support assembly includes a support element on which the body part rests. The support element has a mounting plate secured on the assembly and a resilient pad portion secured to the plate. The resilient pad portion has an engagement surface which engages and supports the body part. The resilient pad portion has openings therein which soften the resilient pad portion so that relatively harder and more durable material may be used for the resilient pad portion, while still providing adequate deformation to the shape of the body part to prevent denting of the body part.

26 Claims, 4 Drawing Sheets

RESILIENT SUPPORT BLOCKS

BACKGROUND OF THE INVENTION

1. Field of the Invention

This invention relates to systems for supporting body parts of a product during assembly, and more particularly to the structures for supporting the body parts of a vehicle during assembly thereof into the finished vehicle.

2. Description of the Prior Art

In the conventional automobile assembly plant, a series of identical body parts are made and placed on an assembly line. The assembly line comprises a number of movable support assemblies. A body part rests on each support assembly and is transported on it through a series of work stations where various types of work are performed on the body part preparatory to its assembly into the finished vehicle.

Each support assembly has a number of support elements on which the body part rests. Because the body parts of the series are essentially identical to each other, the support elements are conventionally configured to matingly fit against the particular portion of the particular type of body part, and to be used repeatedly for similar body parts. The conventional support elements comprised a metal block on the assembly which had a curved engagement surface which substantially matched the curvature of the body part. A thin urethane coating about 3/16 of an inch thick covered the block.

A major disadvantage of this type of support element is that the hard shape of the metal block tends to dent the sheet metal of the body part. Also, because the support element is rigidly configured to a specific shape of body part, a change in the type of car being manufactured requires a complete retooling of the assembly line. Additionally, the manufacture of the blocks with curved surfaces is relatively expensive.

SUMMARY OF THE INVENTION

Accordingly, it is an object of this invention to provide a low-cost support element which does not present the problem of denting or retooling which arise in the prior art.

The present invention provides a pad structure for securement to the support assembly. A mounting portion is connected to the support assembly, and a pad formed of resilient material is attached to the mounting portion. The pad has angled engagement surface on which the body part rests. The pad has a middle portion with cavities therein which make the pad softer in the middle than at the ends to more readily deform to conformingly engage a convexity of the body part.

It is further an object of the invention to provide a pad structure which is durable while being soft enough to deform during support of the body part to prevent denting.

It is also an object of this invention to provide a pad which gives full support of the body part while being readily conformable to the shape of the part.

Other objects and advantages of the invention will be apparent from the foregoing specification, and the scope of the invention will be described in the claims.

DESCRIPTION OF THE INVENTION

During assembly of some manufacture articles, such as an automobile or an airplane, a series of identical body parts are fabricated from sheet metal or other material and placed on an assembly line. The body parts each rest on a respective movable support assembly or rack which carries the body part along in the assembly line. This support assembly comprises a plurality of support elements or rest blocks which contact and support the body part.

Figures 1, 2, 3, 4, 5:
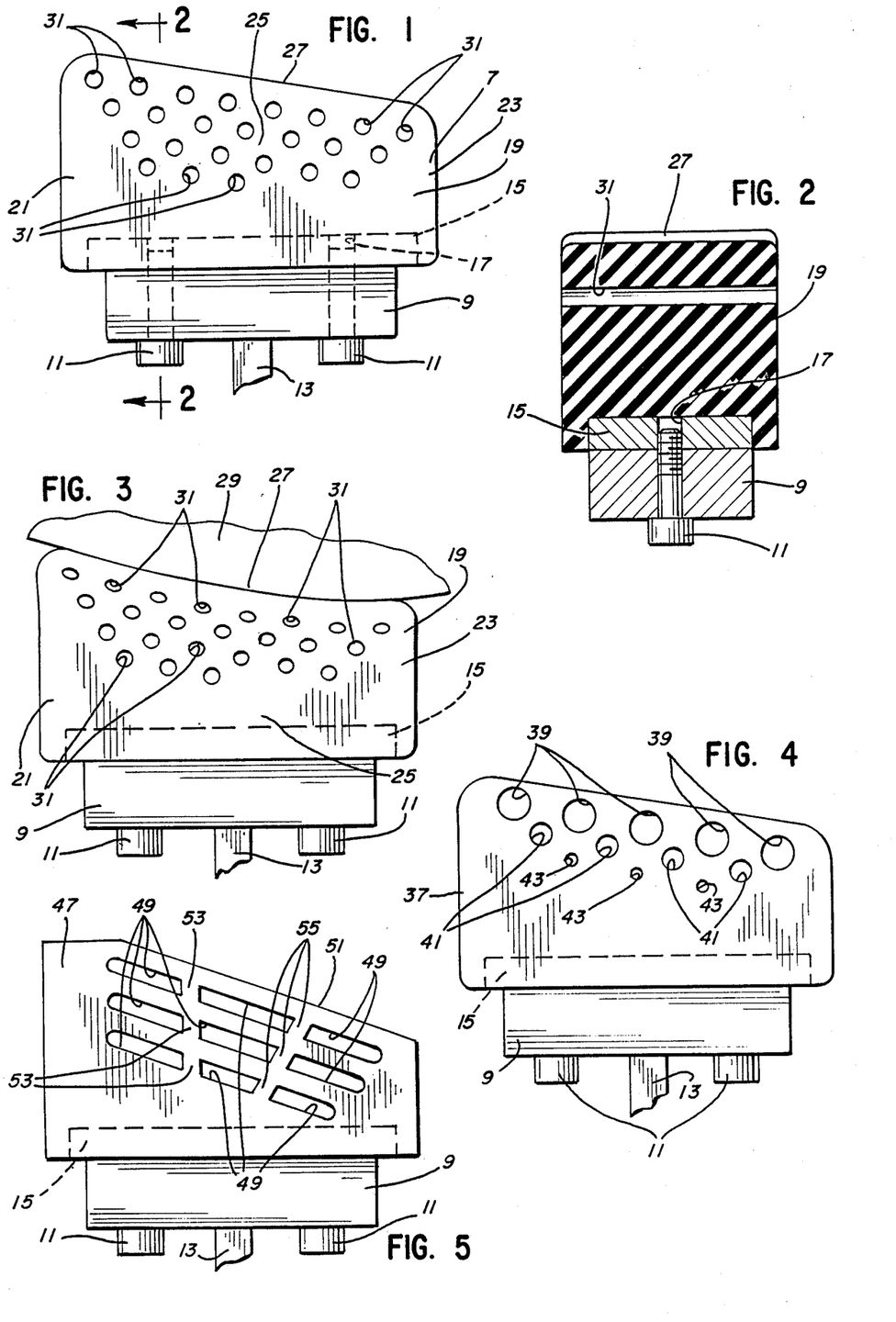
FIG. 1 shows a elevational view of a resilient pad support structure used for lifting a body part.
FIG. 2 is a sectional view taken along line 2-2 of FIG. 1.
FIG. 3 is an elevational view as in FIG. 1, but showing the deformation of the pad structure when supporting the body part.
FIGS. 4 and 5 disclose alternate designs of pad structure for the application shown in FIGS. 1 through 3.

FIGS. 1, 2, and 3 show an example of one of the support elements of this invention. Support element 7 is fixedly secured on a mounting structure 9 by securement means such as bolts 11. Mounting structure 9 is supported on support member 13 which is supported on the support assembly. The support assembly is configured for generally horizontal movement for moving the body part down the assembly line. Support member 13 may be also operatively associated with lifting means such as a hydraulic device to move the body part vertically if desired, as, for example, to lift the body part off of the support assembly and lower the body part onto another support assembly placed thereunder.

Support element 7 includes a mounting member 15 formed of substantially rigid material, such as steel. Mounting member 15 is provided with threaded openings 17 therein which receive bolts 11 to secure the support element 7 to mounting structure 9. Resilient portion or pad 19 is fixedly secured to mounting member 15. Adhesive well known in the art may be used to enhance the securement.

Resilient portion 19 has two ends 21 and 23 and an intermediate portion 25 therebetween. Resilient portion 19 also has an engagement surface portion 27 for engaging a body part 29 resting on the support element 7. (see FIG. 3) Engagement surface portion 27 is angulated with respect to mounting member 15 so as to engage the body part in a generally tangential fashion.

The resilient portion 19 may be formed from a variety of materials having resilient properties. In the preferred embodiment, the resilient portion is made of urethane or polyurethane material.

Because a support assembly is used repeatedly with many body parts, the durability of the resilient portion 19 of the support element 7 is of great importance. Generally, harder the material, the longer the life of the support element 7 will be. However, as hardness and durability increase, so does the potential for denting of the shape of the body part 29.

To allow use of a harder grade of urethane material, the resilient portion 19 is provided with openings or cavities 31 therein. These openings 31 extend completely through the resilient portion 19, as best shown in FIG. 2.

As best shown in FIGS. 1 and 3, openings 31 are generally grouped in the middle of the resilient support element 7, and underlying and adjacent the engagement surface portion 27. Each row of openings 31 is shorter than the row above it. This grouping of the openings 31 results in a softening of the middle part of the element 7, and is used because conforming engagement of the substantially planar engagement surface portion 27 with the convexity of the body part 29 requires more deformation in the middle portion 25 of the resilient portion 19. However, the ends 21 and 23 have fewer or no openings therein, and therefore retain a degree of hardness which allows for firm support of the body part 29, while still yielding a support element 7 of good conforming deformability.

As best visible in FIG. 1, the rows of openings 31 are also organized in rows generally parallel to the engagement surface portion 27. The rows are interleaved or staggered, that is, each opening in a loWer row is located between two openings in a higher row. This pattern allows for a good degree of compressibility in the middle portion of the resilient portion 19 for conforming support of a convex body part.

The resilient portion 19 of the preferred embodiment is formed of urethane material having a hardness of approximately 60 to 65 durometer. The hardness of the urethane material may be varied while still retaining some of the benefits of this invention. The hardness of the material could range from as soft as about 30 to 35 durometer to as hard as about 90 to 95 durometer. The resilient portion of all of the embodiments disclosed herein will be understood to be preferably formed of material of this type.

To take advantage of the resiliency of the material, the resilient portion 19 must have a minimum thickness between the mounting portion 15 and the engagement surface portion 27. In the first embodiment, the thickness is generally in the range of from one inch to one-and-one half inches. However, thickness of the resilient members often will exceed this range, and the resilient members of this invention may be in excess of 12 inches thick. Also the thickness of the resilient member could be considerably less than this range while still retaining some of the benefits of the conforming resiliency of the invention.

As best shown in FIG. 2, the planar engagement surface portion 27 of the support element 7 is substantially perpendicular to a vertical plane extending longitudinally with respect to the element 7. In other words, the engagement surface portion 27 slopes in a longitudinal direction, but does not slope in a lateral direction with respect to the element 7. Because of the resiliency of the resilient portion 19, the engagement surface portion 27 can deform to slope somewhat laterally to conform to a body part. This is advantageous, because the same configuration of resilient element can be used with a mirror-image assembly used for supporting a body part which is substantially a mirror-image of the body part 29, which would be for the other side of the vehicle being constructed.

FIG. 4 shows an alternate embodiment of support element for support of a body part similar to that involved in FIG. 3. The support element 37 is provided with staggered rows of openings or cavities 39, 41, and 43. Upper openings 39 are adjacent below engagement surface portion 45, and are larger than mid height openings 41. Mid-height openings 41 are larger than lower openings 43. This pattern also provides a good combination of conformability and support. It will be understood that openings having cresent, polygonal, or other shaped cross-section may be used instead of openings with circular cross section.

FIG. 5 shows a further alternate embodiment of support element for support of a similar body part to that of FIG. 3. Support element 47 has diagonal rows of slots or cavities 49 extending generally parallel to engagement surface portion 51 and extending through the element 47. The slots 49 of the each row are separated by interstitial portions 53 and 55. Interstitial portions 53 line up with each other to form a first support line, and interstitial portions 55 line up to form a second support line. These support lines angle to diverge upwardly in the support element 47. These support lines can support some compressive load from the weight of the body part, but because of their divergence from each other, allow for a conforming engagement with the body part.

Figure 6:
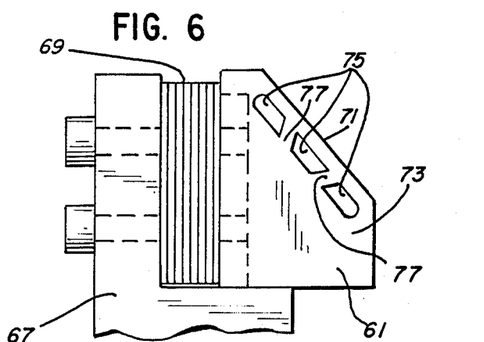
FIG. 6 is an elevational view of another support structure for a body part.
Figure 7:
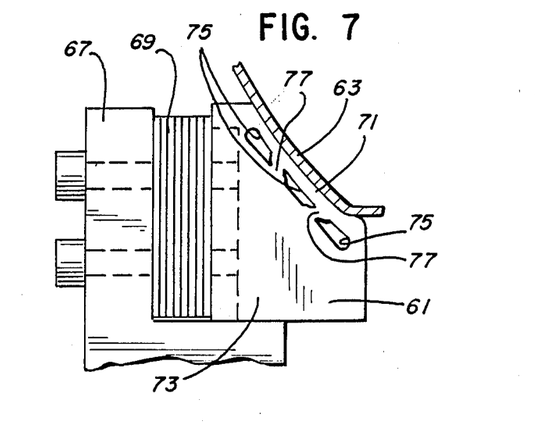
FIG. 7 is a view as in FIG. 6, but showing a portion of the body part resting thereon.

FIGS. 6 and 7 show a support element 61 for supporting a body part 63. Support element 61 includes a vertical mounting plate portion 65 secured as by bolts to mounting structure 67. The vertical mounting portion 65 is used because in the application intended, the lateral force from the body part 63 is greater than vertical force therefrom. Shims 69 are provided between mounting plate portion 65 and mounting structure 67 to locate the support element 61 in the proper position to engage the body part 63.

Support element 61 has an angled engagement surface portion 71 for engaging the body part 63 generally tangentially. The resilient portion 73 of the element 61 has slots 75 therein extending adjacent and generally parallel to engagement surface portion 71 to provide softening of the resilient portion 73 for conforming deformation to the shape of the body part 63.

Interstitial portions 77 separate the slots 75. Interstitial portions 77 extend diagonally to diverge upwardly. This provides a similar support and conformability effect to that described above regarding the embodiment of FIG. 5.

Figure 8:
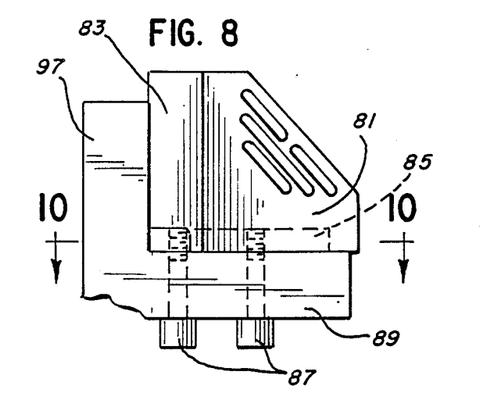
FIG. 8 is an elevational view of another support structure which is angled with respect to the underlying mounting assembly for engaging the surface of a body part which extends obliquely with respect to the mounting assembly.
Figure 9:
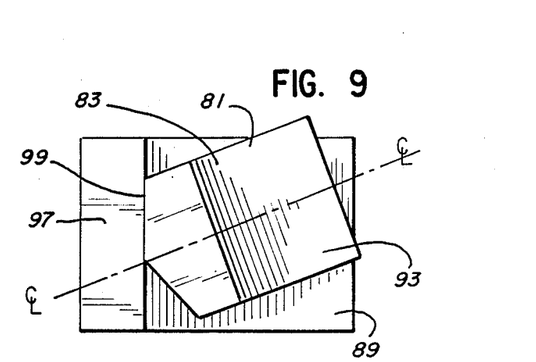
FIG. 9 is a plan view of the pad in FIG. 8.
Figure 10:
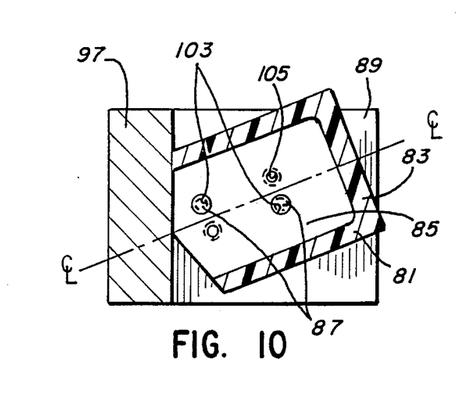
FIG. 10 is a sectional view taken along line 10-10 of FIG. 8.

FIGS. 8, 9, and 10 illustrate another embodiment for use at an angle with respect to the associated mounting structure for engaging a body part having a convexity located slightly to the side of the support element.

As best visible in FIG. 8, angled support element 81 comprises a resilient pad portion 83 bonded to a mounting portion 85. The mounting plate portion 85 is secured by bolts 87 to mounting structure 89.

As best shown in FIG. 10, the resilient portion 83 is angled with respect to the mounting structure 89, and has an engagement surface 93 which is disposed to generally tangentially engage a body part convexity which is displaced laterally from the mounting structure 89. Slots 95 underlie engagement surface 93 and extend generally parallel thereto completely through the resilient portion 83.

Mounting structure 89 includes a generally vertical support wall 97 to aid the resilient portion 83 in support of lateral forces applied thereto. Resilient portion 83 has a first support wall engagement portion 99 which is angled with respect to a longitudinal centerline of the support element 81 to flushly engage the wall while the gradient of the downward slope of engagement surface is angularly displaced from a plane normal to the support wall 97. Support wall engagement portion 99 engages support wall 97 and lateral loads in the resilient portion 83 are transmitted through this engagement.

Because the body parts of manufactured articles are such as automobiles or airplanes are symmetrical, that is, a body part on one side of the vehicle is substantially a mirror image of a similar body part on the other side of the vehicle, each support assembly is often a mirror image of a second support assembly for supporting the mirror image part. Therefore it is desirable to produce support elements which can be used with either the left handed body part or the right handed body part of the finished article. This is advantageous from the standpoint of efficiency of production of the support element.

With this in mind, support element 81 is substantially symmetrical about the indicated centerline and has a second support wall engagement surface 101 which is symmetrically angled across the center line relative to support wall engagement portion 99. Also, to facilitate use of the same support element 81 with either a left handed or right handed body part, the mounting plate portion 85 is provided with first and second sets of securement openings 103 and 105. These openings are also located symmetrically with the respect to each other along a longitudinally center line of the support element 81. Securement openings 103 securingly receive bolt 87 when securement element 81 is used with a first body part, and securement openings 105 are used with bolts 87 to secure the element 81 on mounting structure 89 for use with the mirror image body part, wherein support wall engagement portion 101 engages support wall 97.

Figure 11:
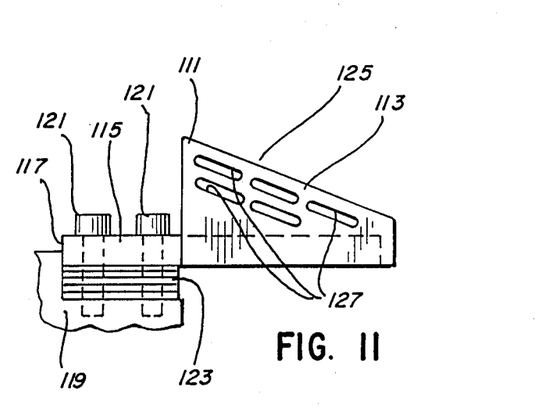
FIG. 11 is an elevational view of another alternate embodiment of resilient support structure of this invention.

As best shown is FIG. 11, a resilient support element 111 can be provided with a resilient portion 113 secured to a mounting portion 115 which extends longitudinally beyond resilient portion 113 to support the resilient portion 113 in a cantilever structure. The inward end 117 of mounting portion 113 is secured on mounting structure 119 of the underlying support assembly by bolts 121 extends there through. The precise height of the element 11 is adjusted by use of shims 123. A body part may then rest on engagement surface 125 which overlies a plurality of slots 127 extending generally parallel to engagement surface 125 for softening the pad for conforming support of the body part.

FIGS. 12,13,19, and 20 show support elements 131 and 141 which are used to support body part portions 133 and 143. Body part portions 133 and 143 are portions of the body which have a substantial bend or angle therein, which provides the body part portions 133 and 143 with an additional degree of structural rigidity which resists denting. This resistance to denting permits use of a pad which does not have the openings therein discussed above. Resilient elements 131 and 141 each have a mounting plate portions 135 and 145 which are secured to underlying mounting structure 137 and 147 by bolts 139 and 149 which extend through apertures 140 and 150 in elements 131 and 141. Both elements 131 and 141 have a planar, substantially horizontal engagement surface which engages and supports the body part portion 133 and 143. The thickness of the resilient portions of elements 131 and 141 from the engagement surface to the upper surface of mounting plate portions is generally in the range of 5 to 7 inches.

Figures 12, 13, 14, 15, 16, 17, 18:
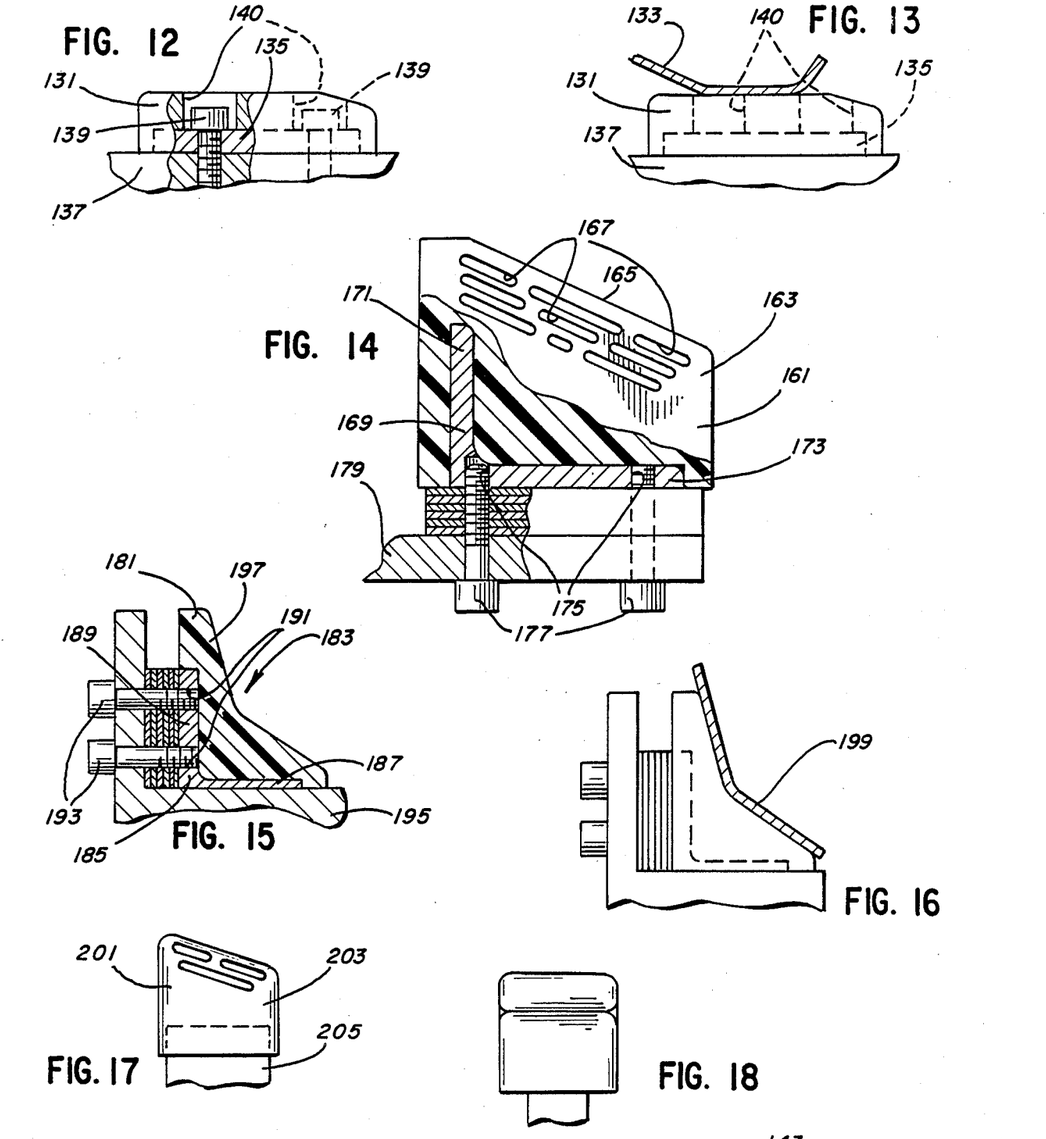
FIG. 12 is an elevational view of another resilient support structure.
FIG. 13, is a view of the pad of FIG. 12, but showing a body part resting thereon.
FIG. 14 is a partially cut-away elevational view of an alternate embodiment of resilient support structure.
FIG. 15 is an elevational section view taken at a vertical plane passing through a further alternate embodiment of resilient support structure.
FIG. 16 shows the support structure of FIG. 15 with a body part resting thereon.
FIG. 17 is an elevational view of another embodiment of resilient support structure.
FIG. 18 is an end view of the support structure of FIG. 17.
Figure 19:
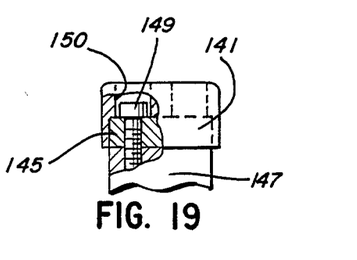
FIG. 19 is a partially cut-away elevational view of another embodiment of resilient support structure.
Figure 20:
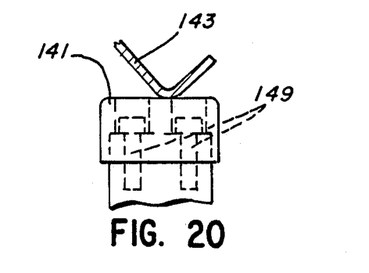
FIG. 20 is a view of the support structure of FIG. 19, but showing a body part resting thereon.

FIG. 14 shows an another embodiment in the form of resilient support element 161. Resilient support element 161 includes a resilient portion 163 which has a body part engagement surface 165 overlying a plurality of rows of slots 167 for conforming support of the body part. The resilient portion is secured to angle member 169 which extends within resilient portion 163. Angle member 169 includes a generally vertical flange 171 formed integral with a generally horizontal flange 173, and is commonly available metal stock. Horizontal flange 173 has openings 175 therein which receive bolts 177 for securing support element 161 on mounting structure 179. The angle member 169 is provided to give additional support for lateral loads created by engagement of the body part on engagement surface 165. The resulting element 161 is relatively easy to fabricate from widely available angle irons, or similar materials.

FIGS. 15 and 16 disclose resilient support element 181 which configured with a recess therein generally indicated at 183. Support element 181 includes an angle member 185 which has first and second generally perpendicular flange members 187 and 189. Flange 189 is provided with securement opening 191 for receiving bolts 193 to secure the element 181 on mounting structure 195. Resilient element 181 also includes a resilient portion 197 which is molded to substantially the same contour as the body part portion 199 which the element 181 is provided to support. The design of element 181 provides for an element which can readily fabricated from widely available angle materials, and which is relatively easy to form, as by molding the urethane material of the resilient portion 197.

FIG. 17 and 18 disclose a further embodiment of support element. Support element 201 includes a resilient portion 203 bonded to a mounting member 205 which projects upwardly from the underlying support assembly.

Figure 21:
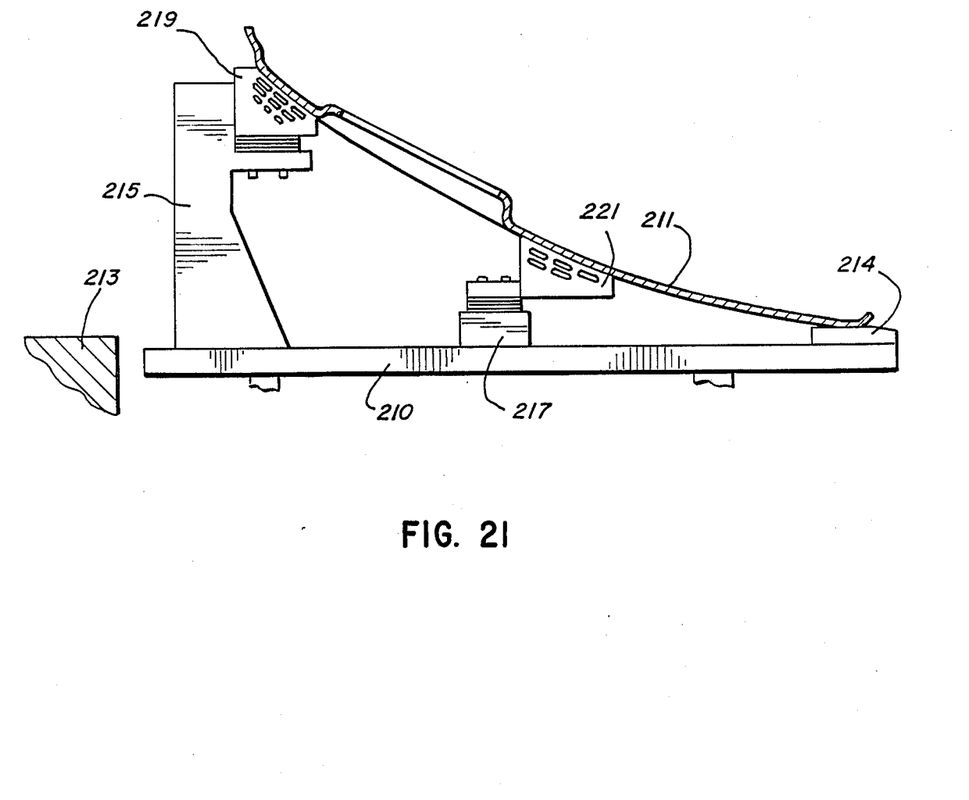
FIG. 21, an elevational view of a support assembly making use of support elements of this inventions and having a body part resting thereon.

FIG. 21 shows a support assembly 210 for support of an automobile body part 211 shown in partial section. Support assembly 210 is supported on movable means for movement: adjacent a substantially stationary deck 213. Support assembly 210 supports resilient element 214 thereon, and includes mounting structure 215 and 217, each of which supports a resilient support element 219 and 221, which are similar to members of the group of embodiment described above.

In addition to use of the supports disclosed herein with vehicle bodies, such as automotive or air craft bodies, the support elements of this invention may also be used during assembly of other manufactured articles having body parts, such as refrigerators, washing machines, and other articles.

The foregoing description and drawings merely explain and illustrate the invention, and the invention is not limited thereto, except insofar as the appended claims are so limited, as those skilled in the art who have this disclosure before them will be able to make modifications and variations therein without departing from the scope of the invention.

What is claimed is:

1. A body part support structure for supporting a body part of a manufactured article during assembly of the article, the body part being relatively easily deformable and selectively including a body part convex portion said support structure comprising:
   an underassembly having an upwardly disposed connection portion; and
   a part body engagement structure supported on the underassembly and comprising:
   a mounting portion secured in engagement with the connection portion, and
   a pad member means connected with said mounting portion and having a generally planar engagement surface for engaging the body part during support thereof without deforming the body part, said pad member means being formed of resilient material for support of the body part without damage thereto and having first and second longitudinal end portions and an intermediate portion extending therebetween and a pad thickness extending between said mounting portion and engagement surface, said intermediate portion having a plurality of openings concentrated in the half of the pad thickness adjacent said engagement surface.

2. The invention according to claim 1, and
   said engagement surface being angulated with respect to the mounting portion for improved engagement with the vehicle body part.

3. The invention according to claim 1, wherein said openings are elongated in a direction generally parallel to the engagement surface of the pad member to enhance the deformation of the pad member to conform to the curvature of the convex portion of the body part.

4. The invention according to claim 1 wherein said openings extend transversely substantially completely through the pad member.

5. The invention according to claim 1, and
   said resilient material being generally in the range of 30 to 95 durometer in hardness.

6. The invention according to claim 1, and
   said resilient material being generally in the range of 50 to 75 durometer hardness.

7. The invention according to claim 1, and
   said resilient material being polyurethane.

8. The invention according to claim 1, wherein
   said intermediate portion having a plurality of openings said openings being grouped generally in the middle of said intermediate portion, and adjacent to said engagement surface to enhance the deformability of the pad member in support of the convex portion of the vehicle body part.

9. The invention according to claim 8, wherein said openings have an elongate cross section with a first cross section dimension exceeding a second cross section dimension by a factor of about two or more.

10. The invention according to claim 9 wherein said first dimension is substantially parallel to said planar engagement surface.

11. A body part support structure for supporting a body part of a manufactured article during assembly of the article, the body part being relatively easily deformable and selectively including a body part convex portion said support structure comprising:
    an underassembly having an upwardly disposed connection portion; and
    a body part engagement structure supported on the underassembly and comprising:
    a mounting portion secured in engagement with the connection portion, and
    a pad member means connected with said mounting portion and having a generally planar engagement surface for engaging the body part during support thereof without deforming the body part;
    said pad member being formed of resilient material for support of the body part without damage thereto; and
    said pad member having first and second longitudinal end portions and an intermediate portion extending therebetween, said intermediate portion softer than the end portions to facilitate conforming deformation of the pad member to the shape of the body part when supported thereof for supporting the body part convex portion on the engagement surface; and
    said intermediate portion having first and second cavities therein generally located in a first plane parallel to the engagement surface, said cavities being separated by an interstitial portion positioned therebetween;
    said intermediate portion having a third cavity therein spaced further from the engagement surface than the first and second cavities,
    said third cavity underlying the interstitial portion in a direction generally normal to engagement surface of the pad member whereby the pad member is of enhanced durability while being flexible for deformation to accommodate the contour of the vehicle body part.

12. The invention according to claim 11, and
    said cavities each being elongated in a plane generally parallel to said engagement surface.

13. The invention according to claim 11, and
    said cavities each having a generally circular crosssection when the pad member is not deformed.

14. The invention according to claim 13, and
    said first and second cavities being larger in crosssectional area than said third cavity.

15. The invention according to claim 11, wherein said openings have an elongate cross section with a first cross section dimension exceeding a second cross section dimension.

16. The invention according to claim 15 wherein said first dimension is substantially parallel to said planar engagement surface.

17. The invention according to claim 11, and
    said intermediate portion having third and fourth cavities therein generally located in a second plane parallel to the first plane and further from the engagement surface, said third and fourth cavities being separated by a second interstitial portion;

said first and second interstitial portions being generally aligned along a line extending through said engagement surface.

18. The invention according to claim 17, and said line being at an angle of less than 90 degrees to the engagement surface and extending diagonally inwardly of the pad member and away from the engagement surface.

19. The invention according to claim 18, and said pad member having a fifth cavity therein generally in said first plane adjacent the second cavity and separated therefrom by a third interstitial portion, and a sixth cavity generally in said second plane adjacent the fourth cavity and separated therefrom by a fourth interstitial portion, said third and fourth interstitial portions being generally aligned along a second line conveying toward the first line inwardly of the pad member whereby the pad provides support for the weight of the vehicle body part while retaining deformability for conforming to the shape of the vehicle body part.

20. A body part support structure for supporting a relatively easily deformable body part of a vehicle during assembly of the vehicle, said support structure comprising:

support means including a generally horizontal connection portion, and a generally vertical wall portion adjacent the connection portion;

a body engagement structure comprising:

a mounting portion supported on the connection portion;

securement means securing the mounting portion in engagement with the connection portion;

a pad member means secured in engagement with the mounting portion, said pad member means being formed of resilient material and having a generally vertical first engagement surface engaging the wall portion of the support means and a generally planar sloping second engagement surface for engaging the body part for support thereof without deforming the body part, said pad member means having a pad thickness normal to said second engagement surface and a plurality of openings concentrated in the half of the pad thickness nearest said second engagement surface; and said generally planar second surface sloping generally downwardly away from the wall and the gradient thereof angularly displaced from a vertical plane extending normal to the wall portion for supportingly engaging the body part when the body part has a convexity displaced laterally from the body engagement structure.

21. A support structure for supporting a body part of a vehicle during assembly of the vehicle, said support structure comprising;

support means including a generally horizontal connection portion, and a generally vertical wall portion adjacent the connection portion;

a body engagement structure comprising:

a mounting portion supported on the connective portion;

securement means securing the mounting portion in engagement with the connection portion;

a pad member secured in engagement with the mounting portion;

said pad member being formed of resilient material and having a generally vertical first engagement surface engaging the wall portion of the support means and a generally planar sloping second engagement surface engaging the body part for support thereof;

said generally planar second surface sloping generally downwardly away from the wall and the gradient thereof angularly displaced from a vertical plane extending normal to the wall portion for supportingly engaging the body part when the body part has a convexity displaced laterally from the body engagement structure, said pad member having a third engagement surface angulated with respect to the gradient of the sloping engagement surface to extend symmetrically with respect to the first engagement surface whereby the body engagement structure may be used with a generally mirror image support structure for a similar body part for the other side of the vehicle.

22. A body part engagement structure adopted to be mounted on a support assembly for supporting a relatively easily deformable body part of a vehicle during assembly thereof, said engagement structure comprising:

an angle member having first and second flange portion, and an included member angle, less than or equal to one hundred eighty degrees between said first and second flange portions, said first flange portion securable to the support assembly, and said second flange portion extending generally away from said first flange position, and a pad portion means being formed of resilient material for supporting the body part without deformation, said pad portion means secured to said first and second flange portions and having said resilient material at least partially filling said member angle, said pad portion means having a generally planar first body engagement surface extending angled relative to the first flange portion for engaging the body part without deforming the body part, whereby the engagement structure may be readily fabricated from readily available stock materials.

23. The invention according to claim 22, and said pad portion means having a generally planar second body engagement surface angulated with respect to the first body engagement surface to form an indentation in the pad portion therewith for securely receiving the body part.

24. In a system for handling vehicle body parts, a body part pad structure supportable on a support assembly for positioning and supporting the vehicle body part, the body part selectively having a body part convex portion and being relatively easily deformable, said pad structure comprising:

a plate member securable to the assembly; and a pad member means secured to the plate member;

said pad member means being formed of resilient material of from 50 to 70 durometer in hardness, said pad member means having two longitudinal end portions, intermediate portion formed integral therewith and extending therebetween, and a generally planar engagement surface portion overlying the intermediate and end portion for engagement of the vehicle body part without deforming the body part, said pad member means having a pad thickness normal to said engagement surface portion and a plurality of openings concentrated in the half of the pad thickness nearest said engagement surface portion generally extending transversely through said intermediate portion; and said engagement surface portion being angled with respect to the body part for engagement therewith.

25. The invention according to claim 24, wherein said openings have an elongate cross section with a first cross section dimension exceeding a second cross section dimension by a factor of about two or more.

26. The invention according to claim 25 wherein said first dimension is substantially parallel to said planar engagement surface.

* * * * *